(12) United States Patent
Burrus et al.

(10) Patent No.: US 11,994,895 B2
(45) Date of Patent: May 28, 2024

(54) SYSTEM FOR SCORING AN ORGANIZATIONAL ROLE CAPABILITY

(71) Applicant: Labor Genome, Ltd., Columbus, OH (US)

(72) Inventors: Will Loren Burrus, Columbus, OH (US); Mark Palmer, Columbus, OH (US)

(*) Notice: Subject to any disclaimer, the term of this patent is extended or adjusted under 35 U.S.C. 154(b) by 1135 days.

(21) Appl. No.: 14/038,896

(22) Filed: Sep. 27, 2013

(65) Prior Publication Data

US 2015/0095318 A1 Apr. 2, 2015

(51) Int. Cl.
*G06Q 10/00* (2012.01)
*G06F 7/00* (2006.01)
*G06F 17/30* (2006.01)

(52) U.S. Cl.
CPC ......... *G06F 17/3053* (2013.01); *G06Q 10/00* (2013.01)

(58) Field of Classification Search
CPC ..... G06Q 10/063112; G06Q 10/06311; G06Q 50/10; G06Q 10/06; G06F 17/305; G06F 17/3053

USPC ....... 707/723, 748, 752; 705/7.13, 7.42, 321
See application file for complete search history.

(56) References Cited

U.S. PATENT DOCUMENTS

| | | | | |
|---|---|---|---|---|
| 2002/0055870 A1* | 5/2002 | Thomas | ................. | G06Q 10/06 705/7.14 |
| 2005/0175970 A1* | 8/2005 | Dunlap | ................. | G09B 19/04 434/185 |
| 2007/0239513 A1* | 10/2007 | Vlanjic | ................. | G06Q 10/06 705/321 |
| 2009/0248685 A1* | 10/2009 | Pasqualoni | ............ | G06Q 30/08 |

* cited by examiner

Primary Examiner — Md. I Uddin

(57) ABSTRACT

Systems and methods for quantifying a user capability in accordance with an organizational role are disclosed herein. In an aspect, a role capability assessment is deployed to a user comprising at least one question whereby the user selects at least one answer that corresponds to the at least one question and the at least one answer conveys information to determine the capability of the user to perform an organizational role. In another aspect, a set of answer data associated with the at least one answer is received whereby the set of answer data correlates to the capability of the user to perform a role within an organization.

18 Claims, 15 Drawing Sheets

| | BASELINE RANGE | DECISION MAKING RANGE | TEAMWORK ADJUSTED RANGE | ENGAGEMENT ADJUSTED RANGE |
|---|---|---|---|---|
| LEVEL 1 | LEVEL 1 BASELINE RANGE | LEVEL 1 DECISION MAKING RANGE | LEVEL 1 TEAMWORK RANGE | LEVEL 1 ENGAGEMENT RANGE |
| LEVEL 2 | LEVEL 2 BASELINE RANGE | LEVEL 2 DECISION MAKING RANGE | LEVEL 2 TEAMWORK RANGE | LEVEL 2 ENGAGEMENT RANGE |
| LEVEL 3 | LEVEL 3 BASELINE RANGE | LEVEL 3 DECISION MAKING RANGE | LEVEL 3 TEAMWORK RANGE | LEVEL 3 ENGAGEMENT RANGE |
| LEVEL 4 | LEVEL 4 BASELINE RANGE | LEVEL 4 DECISION MAKING RANGE | LEVEL 4 TEAMWORK RANGE | LEVEL 4 ENGAGEMENT RANGE |

FIG. 1B

SYSTEM FOR SCORING AN ORGANIZATIONAL ROLE CAPABILITY

TECHNICAL FIELD

This disclosure relates to assessing the role capability of a user and assigning a unique score based on the assessment to better identify the organizational fit of the user.

BACKGROUND

Often, a user seeks to identify a job best suited for the user. In pursuit of determining this job fit the user can complete a screening assessment to assist the user in exploring interests, skills, values, or preferences as they relate to choosing a position or a career. Conventionally, screening assessment tools are based on restrictive personality type categories but do not focus on the capability of a user in association with a particular organzational role. For instance, many personality-based screening assessments categorize a user into one of sixteen personality types based on two dichotomous categories, such as whether a user is an introvert or an extrovert or whether a user is logical or emotional. This type of categorization demonstrates low test-reliability whereby a user can fall into a different personality category upon each iteration of completing the assessment. Moreover, the personality-based assessment lacks the capacity to quantify the users capability to perform a role within an organization or social construct.

Furthermore, the personality-based assessment results and other existing career assessment results fail to account for role specific characteristics of an individual in the context of particular goals, requirements or needs (e.g. needs of a user or organization). As such, current assessments are limited in accuracy, precision, and efficacy with respect to assessing a users potential capability in the context of an organizational role and tailored fit in light of the characterstics associated with such role. Currently, assessments such as the Meyers-Briggs Type Indicator (MBTI); Dominance, Inducement, Submission, and Compliance (DISC) personality assessment; and the Hartman Color Code Personality Profile use traditional personality-based assessment models or a variation thereof to determine how well a person fits within the hiring, promoting, or investing of an organization. Assessments based on personality lack real value in that they fail to account for critical factors such as context and work environment to calculate a user score. Moreover, personality does not indicate 'how well' a person may actually perform a particular job.

Assessments need to be created to provide employers objective talent management indicators and predict actual job qualifications of candidates. There is a need to standardize an approach to measuring workforce data. Furthermore, assessments are needed that can correlate to job performance and cannot be 'gamed'. The inadequacy of current assessments, to provide a successful correlation between assessment results and success within an organizational role, require new and inventive assessments to perform psychometric assessment, quantification of capability, and determination of a users fit with respect to a particular role.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with quantifying a user capability. In accordance with a non-limiting embodiment, in an aspect, a role capability system is provided comprising a memory having stored thereon computer executable components, and a processor configured to execute the following computer executable components stored in the memory: a deployment component that deploys to a user a capability assessment comprising at least one question whereby the user selects at least one answer that corresponds to the at least one question and the at least one answer conveys information to determine the role capability of the user to perform an organizational role; an input component that receives a set of answer data associated with the at least one answer whereby the set of answer data correlates to the capability of the user to perform a role within an organization; an assignment component configured to assign a data value to a subset of answer data based on at least one statistic whereby the data value corresponds to at least one organizational development level; a matching component configured to match the data value to at least one organizational developmental level based on at least one role characteristic in accordance with at least one role characteristic matrix; a scoring component configured to determine a user fit score corresponding to the user whereby the user fit score is based at least on the matched data in association with a fit model; and a translation component configured to translate the user fit score into a semantic representation for presentation at a user interface.

The disclosure further discloses a method, comprising using a processor to execute computer executable instructions stored in a memory to perform the following acts: deploying to a user a capability assessment comprising at least one question whereby the user selects at least one answer that corresponds to the at least one question and the at least one answer conveys information to determine the capability of the user to perform an organizational role; receiving a set of answer data associated with the at least one answer whereby the set of answer data correlates to the capability of the user to perform a role within an organization; assigning a data value to a subset of answer data based on at least one statistic whereby the data value corresponds to at least one organizational development level; matching the data value to at least one organizational development level based on at least one role characteristic in accordance with at least one role characteristic matrix; determining a user fit score corresponding to the user whereby the user fit score is based at least on the matched data in association with a fit model; and translating the user fit score into a semantic representation for presentation at a user interface.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

BRIEF DESCRIPTION OF THE DRAWINGS

FIG. 1B illustrates an example non-limiting orientation matrix related to the disclosed system.

DETAILED DESCRIPTION

Overview

Figure 1:
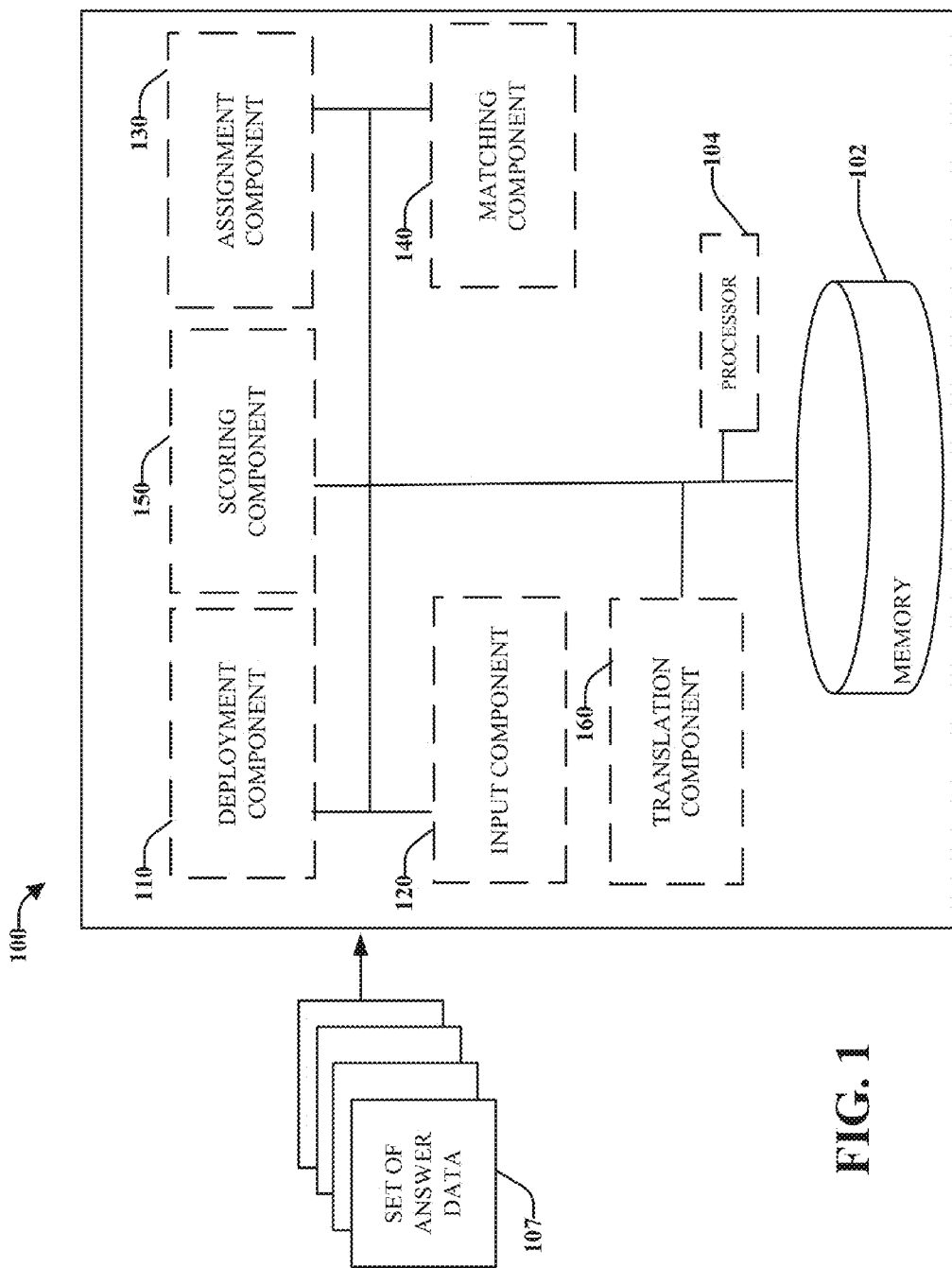
FIG. 1 illustrates an example non-limiting system for quantifying an organizational role capability.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter disclosed in this disclosure relates to a system for scoring the individual role capability of a user. A user's role capability can be depicted as the capacity of that user for applying decision-making, teamwork, and engagement skills in the context of an organizational role. An organizational role can encompass features such as the users ability to; apply role specific skills, process information, problem-solve, interact with others, communicate effectively, manage relationships, execute organizational tasks, contribute user-specific tasks. The disclosed system for scoring user role capability conveys information regarding how a user can best fit a particular role within an organization and provides a standardized quanta to identify indicia specific to such role.

An organization requires at least one of four functions to maintain a long term existence. Each requisite categorical function comprising visionary, strategic, tactical, and administrative utility can be performed by an individual or group of individuals that possess a particular capability or set of capabilities whereby each capability alone or collectively fulfill a role related to a categorical function. The functional categories create a framework to evaluate capability and fit of an individual to perform a role within an organization or functional category. In an aspect, properly aligning a user to an organizational role closely suited to the users' capabilities contributes to sustained company performance and optimized value of the individual best suited for such role or visionary category.

The visionary category analyzes the functions required to shape the identity and ongoing purpose of a company. The strategic category analyzes those functions that address response to market forces, resources, competition, trends and opportunities (development) as well as the planning of high level execution and resource deployment. The tactical category of a company relates to the tasks, details and overall execution capabilities required to achieve an objective. An administrative function analyzes the quality, support and upkeep aspects of a company.

Each category provides insight into the scope and focus of the company goals as pertains to the category. Accordingly, a role can be derived based on these functional categories as well as organizational goals, needs and capability requirements. The system disclosed herein for scoring a user role capability considers these aspects of an organization and individual (e.g. role, goals, functional category) among other factors to identify and quantify each users capability in light of organizational needs and goals. The system can even facilitate the creation and development of roles to match an individual's capabilities and provide long-term value from the implementation of such roles (e.g. create optimal efficiency, agility and effectiveness of an individuals efforts).

The system provides value to organizations, individuals, and other relevant entities in that its format for administering the capability assessment creates a quick and easy-to-use tool whereby the information derived is quantitatively measurable, qualitative, precise, accurate, and useful. Furthermore, the approach of selecting multiple answers for each question whereby each answer is neither correct nor wrong, but rather a reflection of a users orientation, preference, and attributes that are meaningful to that user in the context of a career environment. Additionally, the system provides unique feedback specific to a user and specific to an organization. The user can receive advantageous capability information related to user values, preferences, and performance attributes. The organization benefits by receiving information related to the capabilities of users of interest, understanding the efficacy of roles currently defined within the organization, comprehending whom is the best fit for those roles, and identifying whether new roles need to be created or existing roles need be adjusted. The general ability of the system to quantify, as a standardized metric, the capabilities required to fulfill an organizational role provide tremendous value to organizations, companies, talent agencies, entities and users while promoting a superior experience by the user performing such role.

Example System for Scoring an Organizational Role Capability

Referring now to the drawings, with reference initially to FIG. 1, role capability system 100 is shown that facilitates scoring a user capability in the context of an organizational role. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g. computer(s), computing device(s), virtual machine(s), etc. can cause the machine(s) to perform the operations described. Role capability system 100 can include memory 102 for storing computer executable components and instructions. A processor 104 can facilitate operation of the computer executable components and instructions by the access control system 100.

In an embodiment, role capability system 100 employs a deployment component 110, input component 120, assignment component 130, matching component 140, scoring component 150, and a translation component 160. A deployment component 110 deploys to a user a capability assessment comprising at least one question whereby the user selects at least one answer that corresponds to the at least one question and the at least one answer conveys information to determine the user capability to perform an organizational role. An input component 120 receives a set of answer data associated with the at least one answer whereby the set of answer data correlates to the users individual values with respect to the question presented. An assignment component 130 assigns a data value to a subset of answer data based on at least one statistic whereby the data value corresponds to at least one organizational development level. A matching component 140 matches the data value to at least one organizational development level based on at least one role characteristic in accordance with at least one role characteristic matrix. A scoring component 150 determines a user fit score corresponding to the user whereby the user fit score is based at least on the matched data in association with a fit model. A translation component 160 translates the user fit score into a semantic representation for presentation at a user interface.

In an embodiment, deployment component 110 is configured to deploy to a user a role capability assessment comprising at least one question whereby the user selects at least one answer that corresponds to the at least one question and the at least one answer conveys information to determine the capability of the user to perform an organizational role. In an aspect, the capability assessment is a system for quantifying the capability of a user to perform an organizational role with a numeric score. A user can be any individual, person, group of individuals collectively, organization, employee, consultant, or entity that performs the tasks of the role capability assessment (e.g. selects answers in response to questions). An organizational role can comprise qualities, characteristics or preferences to determine the user best suited for the organizational role.

For instance, an executive level sales position may require complex decision making skills whereby the executive needs to possess visionary qualities, act as a leader to a team of sales personnel, instruct others to best perform tasks, and prefer to serve as an advisor to developing sales personnel. Alternatively, an organization may require entry-level sales personnel to perform administrative tasks such as creating sales databases to better understand the market participants and clients in the industry. Furthermore, the sales person may support the goals and maintain the activities requested to be performed by the executive sales person. Also, the entry-level sales person may prefer collaborating and connecting with new clients on behalf of a company. The two organizational roles are necessary to an organization and require different capabilities, characteristics, preferences, as well as qualities from the individual performing the needs of that role. In an aspect, deployment component 110 deploys a role capability assessment, through a series of questions and answers, to assess the capability of a user to fit a particular organizational role.

In an aspect, deployment component 110 deploys a role capability assessment of a unique format whereby the assessment comprises at least one question and at least one answer corresponding to each question. Thus, in an embodiment, the capability assessment can administer a set of twenty-four questions whereby each question has three answers. In an aspect, the user can select three answers from eighteen answer options. There are no correct or incorrect answers because each answer conveys meaningful information related to user qualities, preferences, characteristics, experience, and other such meaning. The role capability assessment is also unique in that, in an aspect, it can assess a users capability in light of the users own preferences and qualities but also in the context of a particular role an organization requires fulfilled. Thus, system 100, in its entirety, can assist a user to determine roles best suited for that user in any organization. Also system 100 can assist an organization to determine how to best optimize the users participation in the organization while optimizing user performance and self-satisfaction.

In another aspect, the role capability assessment can determine different results for users over time. For instance, over time an entry level sales person can gain visionary insight, better understand the organization to implement new meaningful strategies, engage more effectively with clients, solve tasks with greater efficiency, or provide greater insight to managers regarding processes; thereby augmenting the sales persons capability to fit a new role in context of the users development of or enhancement of: qualities, preferences, or characteristics. As such, the user can select answers, in light of the different or new meaning derived from performing a role. Accordingly, the user can respond differently to the questions administered by the capability assessment.

The answer choices corresponding to each question of the capability assessment convey meaning to the user. A user can select an answer based, in part, on subjective perception, business-related situations, personal experience, based on interpreted associations conveyed by the answer selection, or based on other interpretive faculties executed by the user to derive meaning. The meaning is also related to the question subject matter. For instance, if a question requests the user to select two answer choices based on the user's perception of achieving work goals, then the user can read the answers in a manner relevant to goals of his current or previous roles, an industry, personal experiences of a user when achieving goals, and so on. Each user will select answers to each question based on the users own meaning derived from the question and answers. In alternative embodiments, there can be any variation in the number of questions administered (e.g. 8 questions, 12 questions, 24 questions, etc.) and any variation in the number of answers to be selected by the user (e.g. 2 answers, 3 answers, 4 answers, etc.).

In another aspect, a non-limiting embodiment of deployment component 110 can compartmentalize sets of questions and answers into sections or modules. For instance, in an embodiment, deployment component 110 can deploy a capability assessment comprising twenty four questions whereby the questions are broken into three modules (e.g. decision-making capability module, teamwork capability module, engagement capability module, etc.), whereby each module is comprised of eight questions. In another aspect, each of the twenty-four questions can prompt the user to select either two or three answer choices corresponding to respective questions. In an aspect, each question can correspond to eighteen answer choices. In an aspect, the answer selection can comprise a word, phrase or sentence to convey meaning to a user in the context of the question.

In another non-limiting embodiment, system 100 employs input component 120. In an aspect, input component 120— is configured to receive a set of answer data 107 associated with the at least one answer whereby the set of answer data correlates to the capability of the user to perform a role within an organization. In an aspect, the set of answer data 107 received by input component 120 is associated with the answer selections and other information derived from the capability assessment (e.g. deployed by deployment component 110). The set of answer data conveys a range of information including, but not limited to, information to identify a users capability to perform an organizational role. In an aspect, capability can determine the limit of a users capacity for accomplishing something. The set of data associated with the assessment (e.g. answer selections, user intake information, etc.) can convey information related to decision-making capability, teamwork capability (e.g. ability to work in teams), engagement capability (e.g. proclivity for engaging work, social situations, co-workers, clients, management, etc.), and other such information about a user (e.g. information other than capability information).

In an aspect, decision-making capability refers to a user's general cognitive outlook, or how the user makes sense of information, experiences and outcomes within an organization. It shapes the users ability to organize events, create meaning, solve problems and discover new opportunities. In another aspect, teamwork capability refers to a user's orientation towards others, style of interaction, social interpretation and values. It influences how the user participates in team environments, communicates, navigates social situations, and develops relationships within an organization. In yet another aspect, engagement capability refers to the users underlying motivations, and how the user identifies with organizational working styles and functions. It helps determine the user's drives and general inclination toward specific types of work and opportunities. Along with data associated with role capability assessment answer selections and questions, input component 120 can receive user intake information such as demographic information, educational level, employer identity, industry area, current role, time spent performing the role, and other such user specific information. The data associated with any informational aspect related to the capability assessment can convey capability information regarding the user.

The set of data received by input component 120 can also relate to the role within an organization that may best suit the user. In an aspect, data or a set of data can convey information relevant to an organizational role within the visionary, strategic, tactical, and administrative organizational bands. In order to create sustainable team performance, an organization can align its organizational roles to address the needs of each organizational band. In an aspect, roles that fall within the visionary band function to shape the identity and ongoing purpose of the organization. In another aspect, roles that best fit the strategic band require functions that respond to market forces, resources, competition, trends, and opportunities. Roles that best fit the tactical band require functions that account for task and detail orientation, as well as overall execution within the organization. In another aspect, roles that fit the administrative band require functions that account for quality, support and upkeep of the organization.

There are user capabilities that match roles within each of these bands and the set of data received by input component 120 can convey information related to these roles as a function of the user capabilities. In an aspect, the organizational bands can provide a framework to evaluate the capability of the user and role fit of the user within the organization. Also, the bands are not mutually exclusive in that some roles require functions that fall within multiple bands and thus capabilities associated with those functions. The set of data received by input component 120 can also be organized into subsets of data such as structured capabilities or unstructured capabilities. For instance, a subset of data related to structured capabilities can convey information such as the user is suited for detailed, hands-on, short-term task deliverables or applications. Alternatively, a subset of data related to unstructured capabilities can convey information that a user is better suited for more abstract, big-picture, long-term task deliverables or applications. In an aspect, all of the data related to the role capability assessment (deployed by deployment component 110) can be received by input component 120 as raw data in its entirety, one or more sets of data, or organized data subsets.

In another non-limiting embodiment, system 100 employs assignment component 130 configured to assign a data value to a subset of answer data based on at least one statistic whereby the data value corresponds to at least one organizational development level. In an aspect, system 100 quantifies the capability of a user to perform one or more organizational roles. In an aspect, assignment component 130 facilitates capability quantification by assigning a data value to a subset of the answer data received by input component 120. A data value is an expression of a variable associated with a subset of data. For instance, a subset of data (e.g. capability assessment user intake data and answer data) received by input component 120 can relate to characteristics that indicate a user is focused on implementing a strategic plan and executing the tasks associated with the strategic plan.

In an aspect, assignment component 130 assigns a data value to the subset of answer data (which can include any data received from deployment component 110) based on at least one statistic whereby the data value corresponds to at least one organizational development level. The data value can be based on any number of one or more statistics such as a numerical weighting, a mean (e.g. the sum of a list of data values associated with similar data subsets divided by the number of data subsets), a median (e.g. separating data subsets at the higher half of a data sample), a mode (e.g. separating data values that appear most often in a set of data or subset of data), a probability distribution (e.g. assigning a probability to a data subset of a possible capability outcome associated with a user), standard deviation (e.g. the dispersion or proximity of data points associated with one or more data subsets related to at least one capability characteristic), variance (e.g. determining how far a data value associated with a data subset is from a mean data value), skewness, and other such statistics.

In an aspect, the set of data and associated data subsets related to a users answer data (including user intake data) can be compared (e.g. by statistics) to sets of data and associated data subsets of other individuals with similar characteristics and thus similar performance. Furthermore, in an aspect, the user sets of data and associated data subsets can be compared to other users within a group, team, department, or organization to optimize the fit of the user for an organizational role and increase the likelihood of efficacious performance. For example, an investment professional can be compared to a well-established successful investment professional within the same industry such as Warren Buffet. By comparing the user sets of data and associated data subsets for users to professionals, the user can identify the capabilities demonstrated by the marquee professionals in an industry and view the user's capabilities in relation to those capabilities of such professionals.

In another aspect, the data value assigned to the subset of answer data can be associated with meaning conveyed by the users answer selections. For instance, a user may view an answer in light of a preference of cooperating with a team member to accomplish organizational goals. The subset of answer data can thus be assigned a data value in association with the meaning conveyed from such answer selections. In another aspect, assignment component 130 can assign a data value to a subset of answer data whereby the answer data value corresponds to at least one organizational development level. In an aspect, an organizational development level correlates to a user capability. The organizational development level can correlate to various capabilities and qualities of a user that correspond to the four basic organizational categories.

In another non-limiting embodiment, system 100 employs matching component 140 that can match the data value to at least one organizational development level based on at least one role characteristic in accordance with at least one role characteristic matrix. In an aspect, a matching component 140 can match a data value assigned to a subset of answer data to a organizational development level based on at least one role characteristic in accordance with at least one role characteristic matrix. A role characteristic matrix is an array of data value ranges arranged in rows and columns. A data value can fall within a data range as a function of a role characteristic and a organizational development level. In an aspect, a data value can be adjusted to fall into multiple rows and columns based on various factors (e.g. the type of data subset associated with the data value, a particular capability, a statistical input, etc.). In an aspect, a role characteristic matrix can correlate a data value to a role characteristic. A role characteristic is an indicator of a user's capability in the context of a particular characteristic associated with a role. For instance, in an aspect, the range of data values can be adjusted to fit within a range specific to a user's decision-making orientation, teamwork orientation, or engagement orientation when performing a role. Furthermore, the organizational development level is an indicator as to the degree of which a user fits within a particular role characteristic in the context of one or more developmental characteristics associated with a capability.

In an aspect, matching component 140 can match a data value to role characteristics and organizational development levels of various role characteristic matrixes. For instance, a baseline data value can be assigned (e.g. by assignment component 130) to a subset of answer data in the context of a role characteristic model that determines a users orientation with respect to specific role characteristics. Furthermore, the baseline data value can be matched to role characteristics and organizational development levels related to a preference role characteristic model (e.g. to determine if a user prefers to be an initiator, contributor, motivator, organizer, instructor, etc.). In another aspect, a baseline data value or baseline data value range can be determined for role characteristic models specific to organizational needs (e.g. in determining an organizations roles to be created or currently satisfied, to obtain a view of the organizations current status of operations, etc.) or those specific to a users needs (e.g. in determining best suited careers at a particular time). As such, a data value can be interpreted through a baseline value or a baseline range (of which the data value fits within) and an adjustment to the data value can be made via a matching component 140 to interpret the data within the context of a particular role characteristic matrix.

In another non-limiting embodiment, system 100 employs scoring component 150 configured to determine a user fit score corresponding to the user whereby the user fit score is based at least on the matched data in association with a fit model. In an aspect, a unique characteristic of system 100 is the ability to quantify a users capability to perform one or more roles. The scoring component 150 determines a user fit score corresponding to the user whereby the user fit score is based at least on the matched data in association with a fit model. A fit model is a system tool that configures existing or new data to address a particular audience need.

For instance, in an aspect, the fit model can be a role capability model or an organizational model. A role capability model is a tool configured to determine the role that is best for a particular user and can take into account a variety of other users. For example, a user that seeks to determine the user's role capability to perform the role of a chief operating officer at a health insurance company can view his capabilities against capabilities of other chief operating officers in the same industry or other industries. The role capability model is designed to assist individuals looking for career guidance or capability assessments for personal reasons. In contrast an organizational role model (e.g. labor genome) is a tool intended for an organization to determine the make-up of the user in the context of the organization. The tool is designed to assist an organization in assessing the needs of existing roles and the creation of new roles to achieve the goals of the company. Thus the fit model can be configured to address particular needs of an audience or to tailor the system to assess a specific need (e.g. by changing questions, answers, assessment formatting, role characteristic matrices, etc).

In an aspect, the scoring component 150 is configured to determine a user fit score comprised of a two-digit primary number and a one-digit secondary number whereby the primary number and the secondary number are separated by a colon. The primary number can represent the user work orientation and the secondary number can represent the user role preference. The two-digit primary number is the left number of the fit score (e.g. 34:5) between 0-95. Scoring component 150 determines the user fit score based on a scoring matrix which allows for adjustments to the raw matched data. In an aspect, lower primary numbers indicate a user pension for more structured work and higher primary numbers indicate a user pension for more unstructured work. Furthermore, the primary two-digit number quantifies a user work orientation and describes how the user applies their unique abilities and reasoning. A user may be pragmatic, tactical, hands-on and thus better suited for immediate actions or applications. A user could, alternatively, be more abstract, theoretical and visionary thus better suited to face long-term challenges and develop long-term solutions.

The one-digit primary number located at the right (e.g. 34:5) is a number scored between 0 to 9 where the one-digit number indicates the user role preference or how a person will likely stylistically apply certain competencies. In an aspect, a lower number indicates the degree to which a person likes to work alone and higher numbers indicate the degree to which a person likes to work in groups (e.g. an autonomous person may be an initiator whereas a group-minded person may be better suited as an organizer). For instance, a user with a preference towards mentorship or leadership is energized by providing guidance to a group of people whereby the user may be well suited as the head of an organization, which may indicate a higher secondary number. Conversely, a user preferring to work alone may be an entrepreneur who thrives as an individual contributor to tasks, which may be expressed by a lower secondary number.

In an aspect, scoring component 150 can determine the score based on the role capability of an individual or a group by accounting for the organizational model comprising of key role capabilities that are visionary, strategic, tactical, and administrative to determine the fit score and accordingly the user organizational fit. The fit score can be determined for a group of users to determine the state of an organization. For instance, if an organization has 90% of its company satisfying implementation roles, then there may be an imbalance of roles thereby hampering the ability of the organization to effectively function. In another aspect, the score of one user can be utilized to determine the potential capabilities of another user. For instance, a user can see how they compare to a proven expert within a role by noting the score of an established professional at a particular role. In an aspect, the user fit score is a quantification of a user capability to perform a role.

In another non-limiting embodiment, system 100 employs translation component 160 configured to translate the user fit score into a semantic representation for presentation at a user interface. In an aspect, the user fit score conveys an absolute number that quantifies the user capability to perform an organizational role. The number itself conveys meaning, but translation component 160 translates the user fit score into a semantic representation. The semantic representation is a detailed presentation of the findings associated with the assessment results and user fit score. The semantic representation can describe the user fit score on a more granular level of engagement (e.g. describing what motivates the user), teamwork (e.g. describing the users social interaction) and decision-making (e.g. explaining the users style of reasoning).

For instance, the semantic representation can describe a user's engagement role as expressed by characteristics such as a user's capability to manage information, perform meticulous tasks, focus on accuracy, assert oneself or act decisively. In an aspect, the semantic representation can describe a user teamwork role as expressed by characteristics such as social interaction, dialogue style (e.g. knowledge sharing), proactive response to challenges, realizing mutual objectives, factual social exchanges, or analytical social exchanges. In an aspect, the semantic representation can describe a users decision-making role as expressed by characteristics such as thinking complexity, situation approaches, or reasoning style. In another aspect, translation component 140 can translate user fit scores for presentation at a user interface. The presentation can be in the form of explanatory paragraphs, assessment report formats, a graphic, or other such presentation type.

Figure 1A:
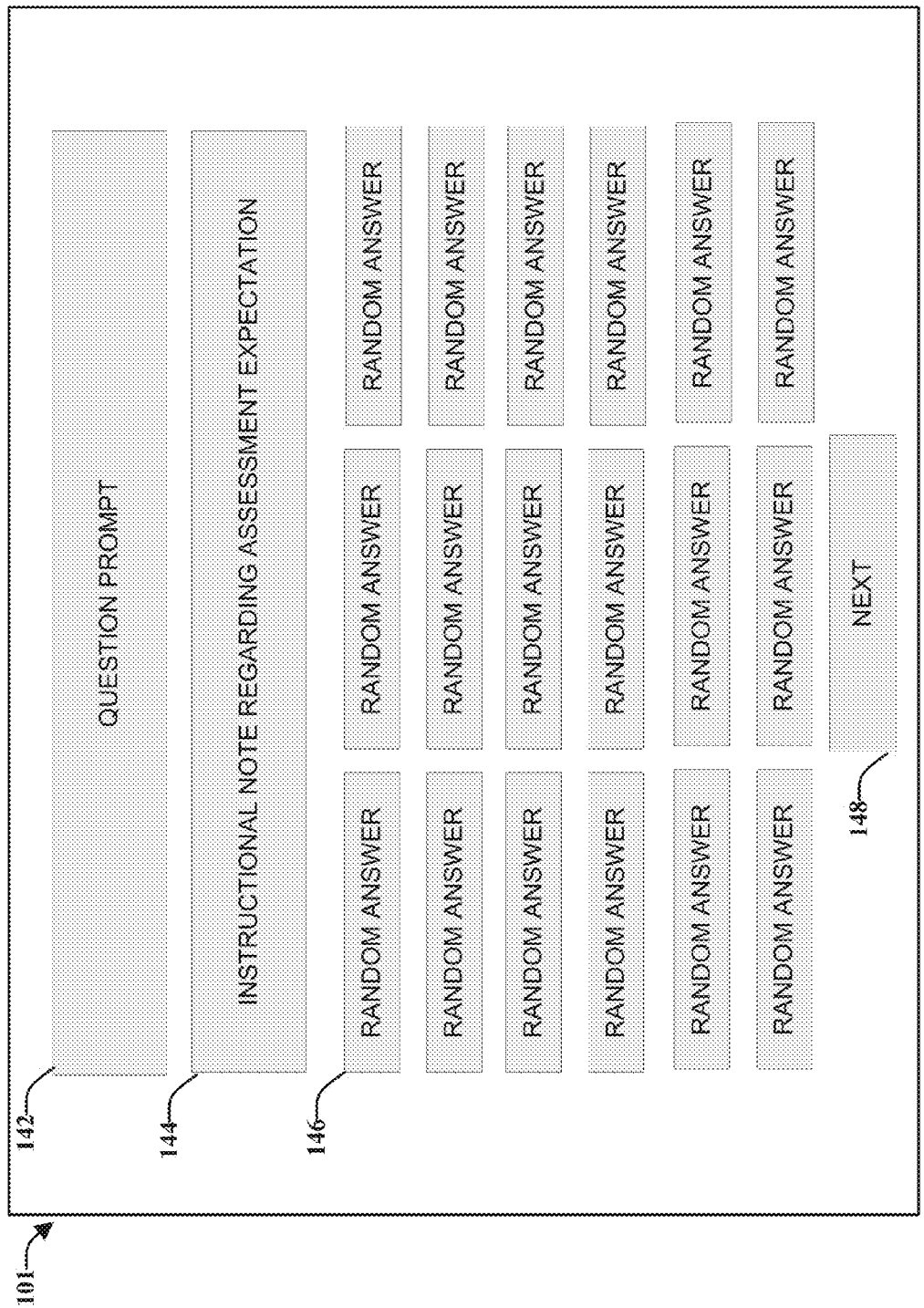
FIG. 1A illustrates an example non-limiting question-answer grid format related to a capability assessment.

Turning now to FIG. 1A, illustrated is a non-limiting embodiment of an answer grid 101 associated with a role capability assessment (e.g. deployed by deployment component 110). In an aspect, question prompt 142 presents a question to the user in order to place the answer choices in context. In another aspect, instructional note 144 provides the user instructions and guidance regarding the answering expectations. For instance, an instructional note 144 may instruct the user to select any three random answer 146 (e.g. word or phrase) in response to the question prompt 142. In yet another aspect, random answer 146 is an answer selection, which may comprise a single word or phrase. In an embodiment, each answer grid can comprise eighteen random answer 146. A user can select more than one random answer 146 depending on the guidance received from instructional note 144.

In another aspect, next tab 148 allows a user to view the following question. In an aspect, a previous tab can be included to allow a user to view the previous question. In yet another non-limiting aspect, a user can be restricted from selecting the next 148 selection if the user has not selected all the answer selections as directed by instructional note 144. In a non-limiting embodiment, an assessment can comprise twenty-four answer grids 101 associated with twenty four questions whereby the assessment comprises three sections (e.g. problem-solving, teamwork, engagement) and each section is comprised of eight questions and associated formats of answer grid 101.

Turning now to FIG. 1B, presented is a non-limiting embodiment of orientation matrix 103. In an aspect, orientation matrix 103 can provide insight as to a user orientation with respect to specific role characteristics. Each data value, associated with a set of answer data or a subset of answer data, can correspond to an orientation level 153 and a baseline range 155. For instance, at orientation baseline range 155 provided is a range of values associated with each orientation level 153. If an assigned data value (e.g. assigned by assignment component 130) falls within an established range of values then the data value is associated with an orientation level 153 as a function of the data value. In an aspect, the data value can be adjusted (e.g. via a statistic) based on orientation indicators to determine orientation capabilities of a user within orientation categories (e.g. decision-making, teamwork, engagement capabilities, etc.).

Thus a subset (or set) of answer data can be associated with more than one orientation level 153 based on the particular orientation category indicia executed by orientation matrix 103. For instance, orientation matrix can determine a set of answer data as a level 1 for decision-making capabilities, a level 4 for teamwork capabilities, and level 2 for engagement capabilities. The primary number of the user fit score can be scored (e.g. in connection with scoring component 150) based, in part, on information (e.g. level determinations, adjusted data, etc.) associated with an orientation matrix 103. An orientation matrix 103 can comprise N levels, wherein N is an integer. Furthermore, in an aspect, orientation matrix can generate data adjustments for L orientation indicia, wherein L is an integer. Also, in an aspect, M orientation categories can be assessed, wherein M is an integer. By determining orientation levels 153 (e.g. calibrating or adjusting data values) for various orientation indicia orientation matrix 103 facilitates the determination of user capabilities based on respective orientation indicia.

Figure 1C:
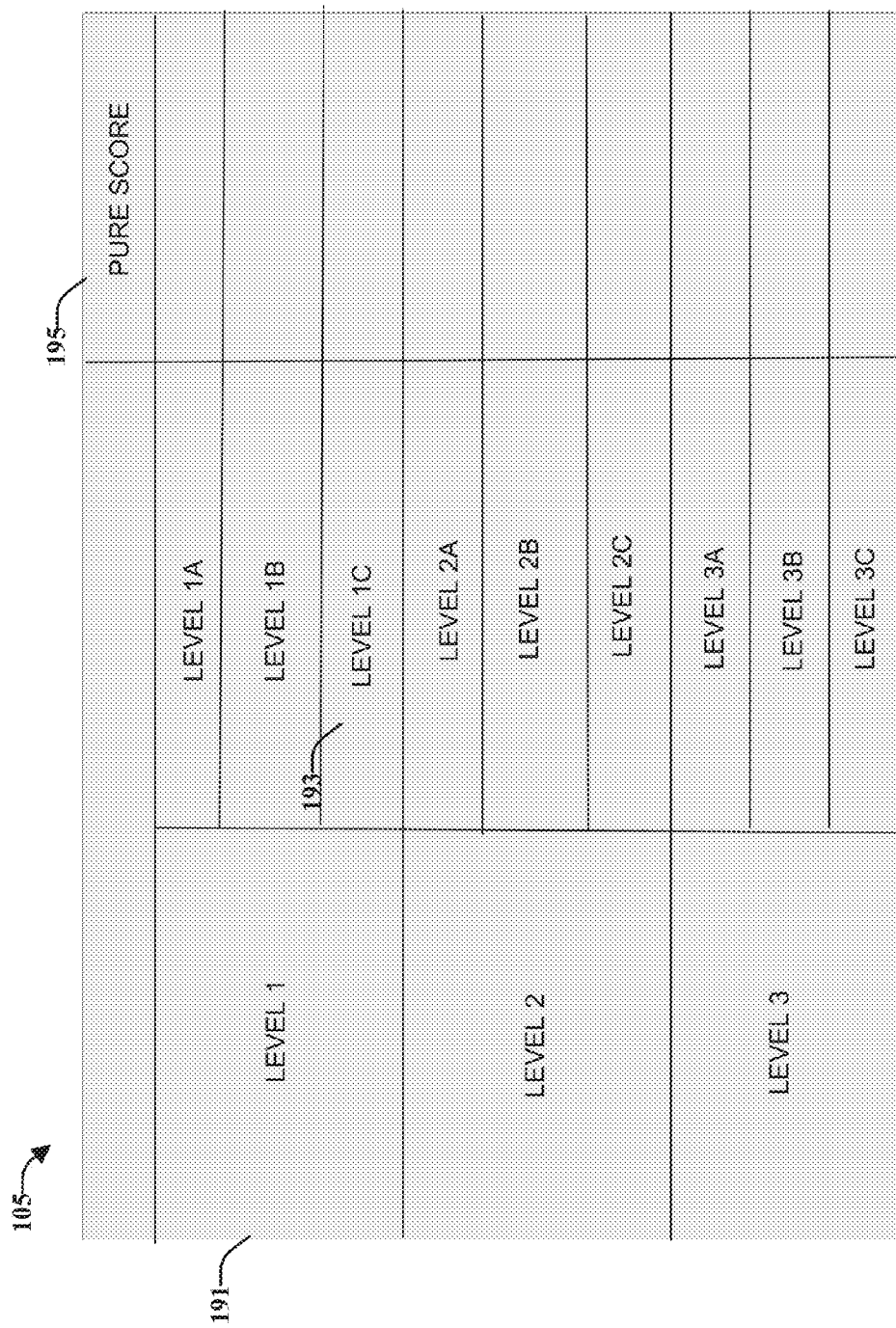
FIG. 1C illustrates an example non-limiting preference matrix related to the disclosed system.

Turning now to FIG. 1C, presented is a non-limiting embodiment of preference matrix 105. In an aspect, preference matrix 105 can provide insight as to a user preference with respect to specific role characteristics. Each data value, associated with a set of answer data or a subset of answer data, can correspond to a preference level 191 based on a broad set of preference indicia. In yet another aspect, preference matrix 105 can determine a preference sub-level 193 based on more detailed sub-indicators. In an aspect, preference matrix 105 can correspond a data value to a pure score based on a preference level 191 and a preference sub-level 193. The secondary number of the user fit score can be scored (e.g. in connection with scoring component 150) based, in part, on information (e.g. level determinations, adjusted data, pure score, etc.) associated with an preference matrix 105. By determining preference levels 193 (e.g. calibrating or adjusting data values) for various preference indicia preference matrix 105 facilitates the determination of user capabilities based on respective preference indicia.

Figure 2:
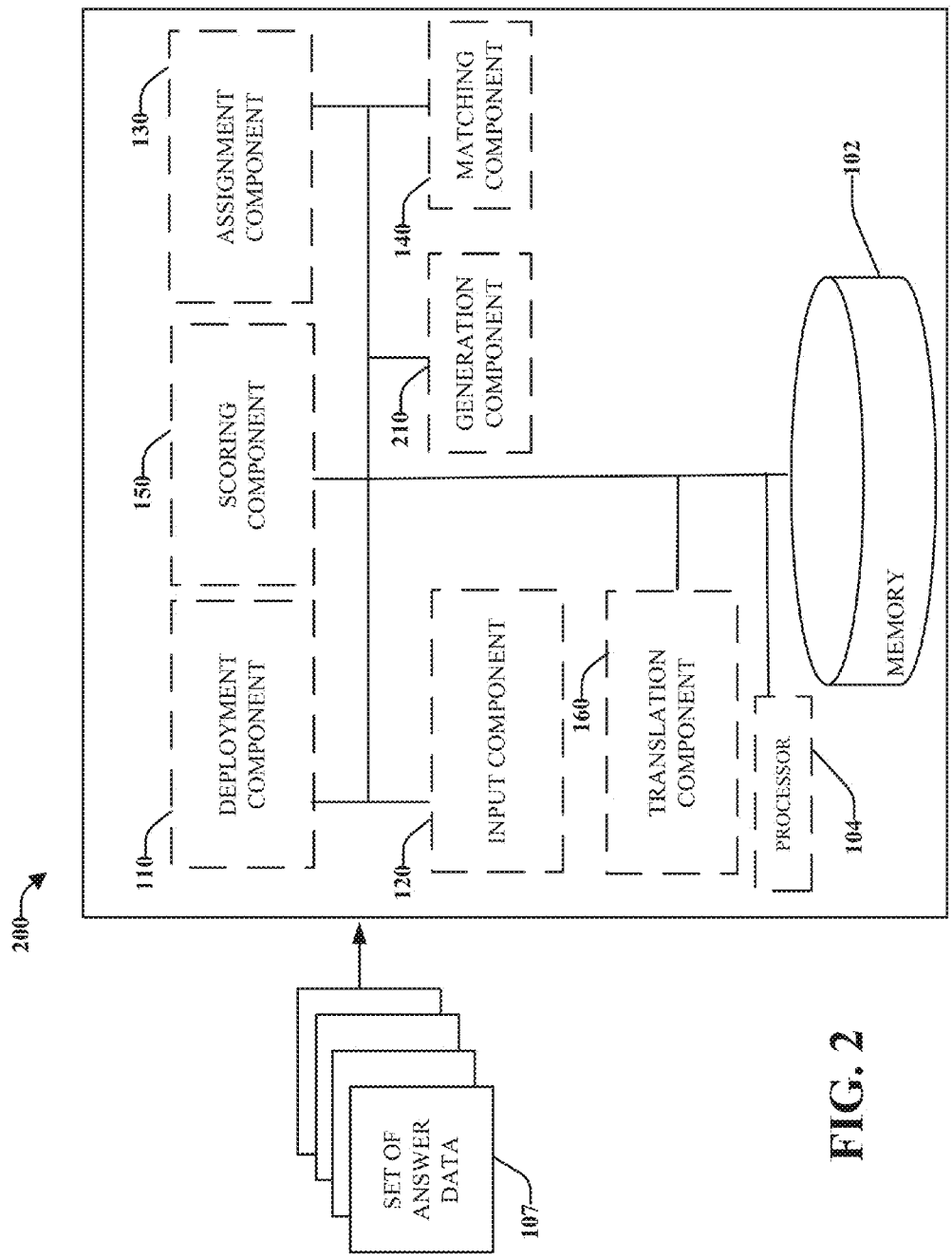
FIG. 2 illustrates an example non-limiting system for quantifying an organizational role capability.

Turning now to FIG. 2, presented is another non-limiting embodiment of system 200 in accordance with the subject of the disclosure. In an aspect, generation component 210 is configured to generate one or more organizational role for a user based on the fit score. After obtaining user assessment results, an organization may discover its lack of pertinent roles to properly address the needs of the organization. In various embodiments, generation component 210 can determine the roles required to meet the organizations short-term and long-term needs and identify the user capabilities required to match such roles. In an aspect, generation component 210 can generate a target score range to compare with a user-candidate score.

Furthermore, the generation component 210 can employ filtering component that screens a volume of candidates for optimal fit within a desired role. In another aspect, generation component can employ comparing component that compares the target score range to the assessment score of each candidate, the generation component 210 can generate a list of candidate users that may be an optimal fit for a desired role. Furthermore, the candidate scores falling outside the target range can be analyzed to determine the overall state of the organization. In another embodiment, generation component 210 can employ comparing component to identify new candidates that possess similar capabilities to those capabilities sought for a particular role. In an aspect, a staffing agency or talent management agency can utilize such tool to identify new candidates for an organizational position. The assessment results and associated scores are unique to each candidate and thus enable an organization to precisely match particular candidates to particular roles.

Figure 3:
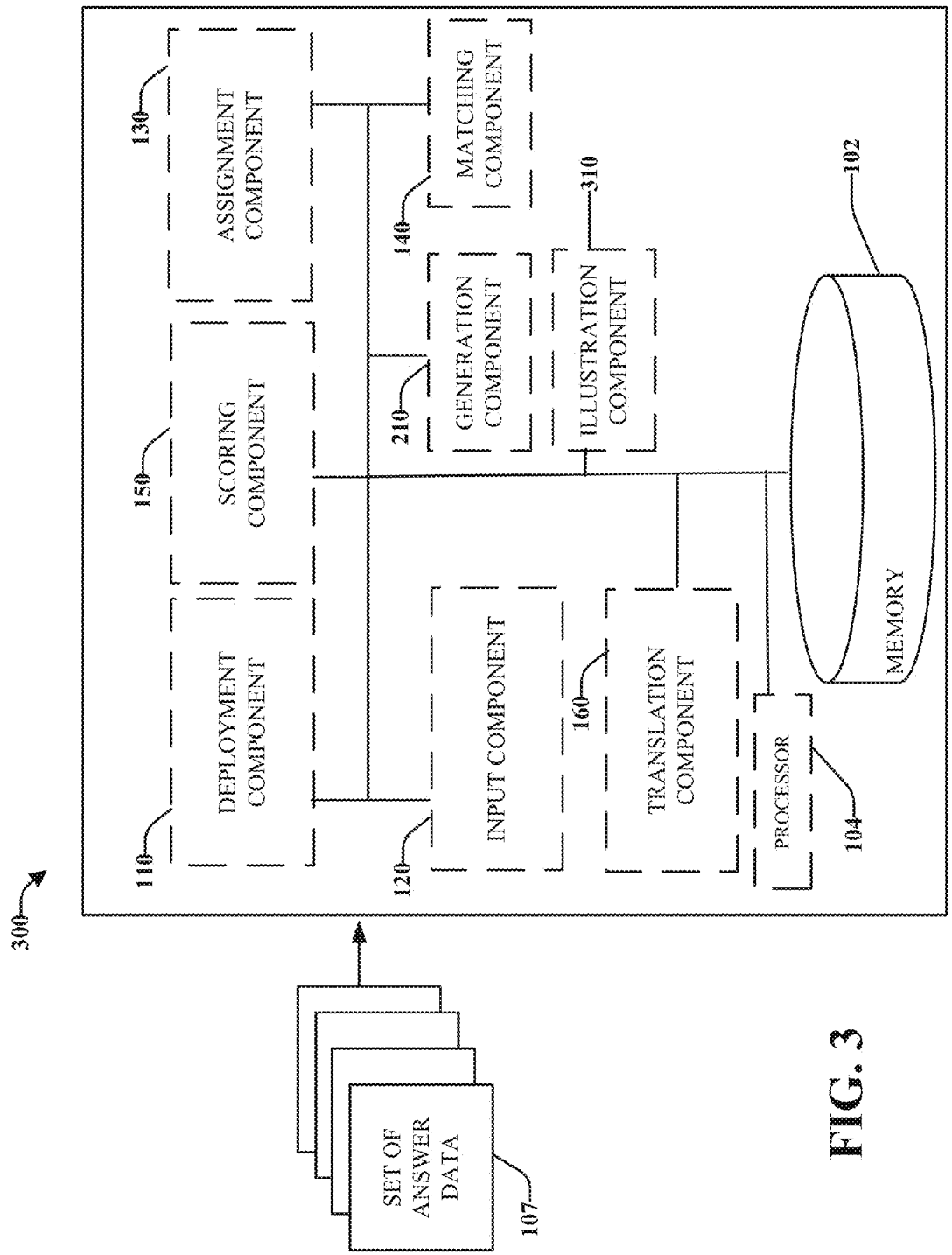
FIG. 3 illustrates an example non-limiting system for quantifying an organizational role capability.

Turning now to FIG. 3, presented is another non-limiting embodiment of system 300 in accordance with the subject of the disclosure. The system of claim 1, further comprising illustration component 310 configured to illustrate a fit score associated with the user or a group of users as a graphical representation, chart, organizational structure, data plot, or rendered drawing. In an aspect, illustration component 310 can generate an illustration to display a group of user scores. For instance, illustration component 310 can illustrate a group of user scores at a four-quadrant graph to demonstrate the overall state of an organization and identify organizational hiring needs relative to role inadequacies, desired organizational goal states and the capabilities of existing users.

In another aspect, illustration component 310 can illustrate assessment results as an assessment report. The assessment report can display the user fit score (e.g. primary number indicates the user decision-making, teamwork and engagement capability; the second number indicates the preferred working style of the user) and the level of certainty that a user fits a particular role (e.g. as a percentage). In an aspect, illustration component 310 can illustrate as a graph display the unique user capability signature as compared to the average user performing that role and given a specific industry. For instance, the graph display of user capability can display two lines, whereby each color is a particular red. In an instance, a red line can indicate a concrete value and a blue line can indicate a greater abstract value. The line graphs can be plotted as a function of complexity, logic, exchange, flexibility, inclination, identity, drive, and purpose on the horizontal-axis.

Furthermore, in an aspect, illustration component 310 can illustrate the primary capability number of the fit score with respect to a fitness line. The fitness categories can show the fit score as either an under-qualified, developing, average, out-growing, or over-qualified designation based on the primary number (e.g. capability indicia) of the fit score. In yet another aspect, illustration component 310 can illustrate the capability balance of the user. The capability balance (e.g. a percentage) can be demonstrated as a triangle illustration transposed over a set of concentric circles whereby the three end points of the triangle correspond to a decision-making measure, engagement measure, and teamwork measure. The distance of each triangle point from the center of all the concentric circles indicate a user capability balance.

For instance, if the distance is from the center point of the concentric circles to the engagement point is short then the user demonstrates a lesser proclivity for engagement. If the distance from the center point of the concentric circles to the decision-making point is the longest then the user has a proclivity towards decision-making capabilities with respect to other capabilities. Together, all three lengths of the triangle can illustrate the overall capability balance of the user (as a function of decision-making, engagement, and teamwork). In another aspect, illustration component 310 can illustrate features of capability categories decision-making, teamwork, and engagement as a bar graph. The fit score can be broken down on an individual level as applied to various features. For instance, the teamwork capability can be broken down into features such as exchange, flexibility, and inclination. The score for a particular feature can be presented along a horizontal spectrum ranging from a left bound orientation (e.g. conservative, concrete, practical, tactical, solo orientation) to a right bound orientation (e.g. abstract, liberal, idealistic, group orientation) the score can be placed along that spectrum to provide visual context of where the score falls along. In an aspect, the position of the user score along a spectrum for a particular feature can provide insight into a user's role capability.

Figure 4:
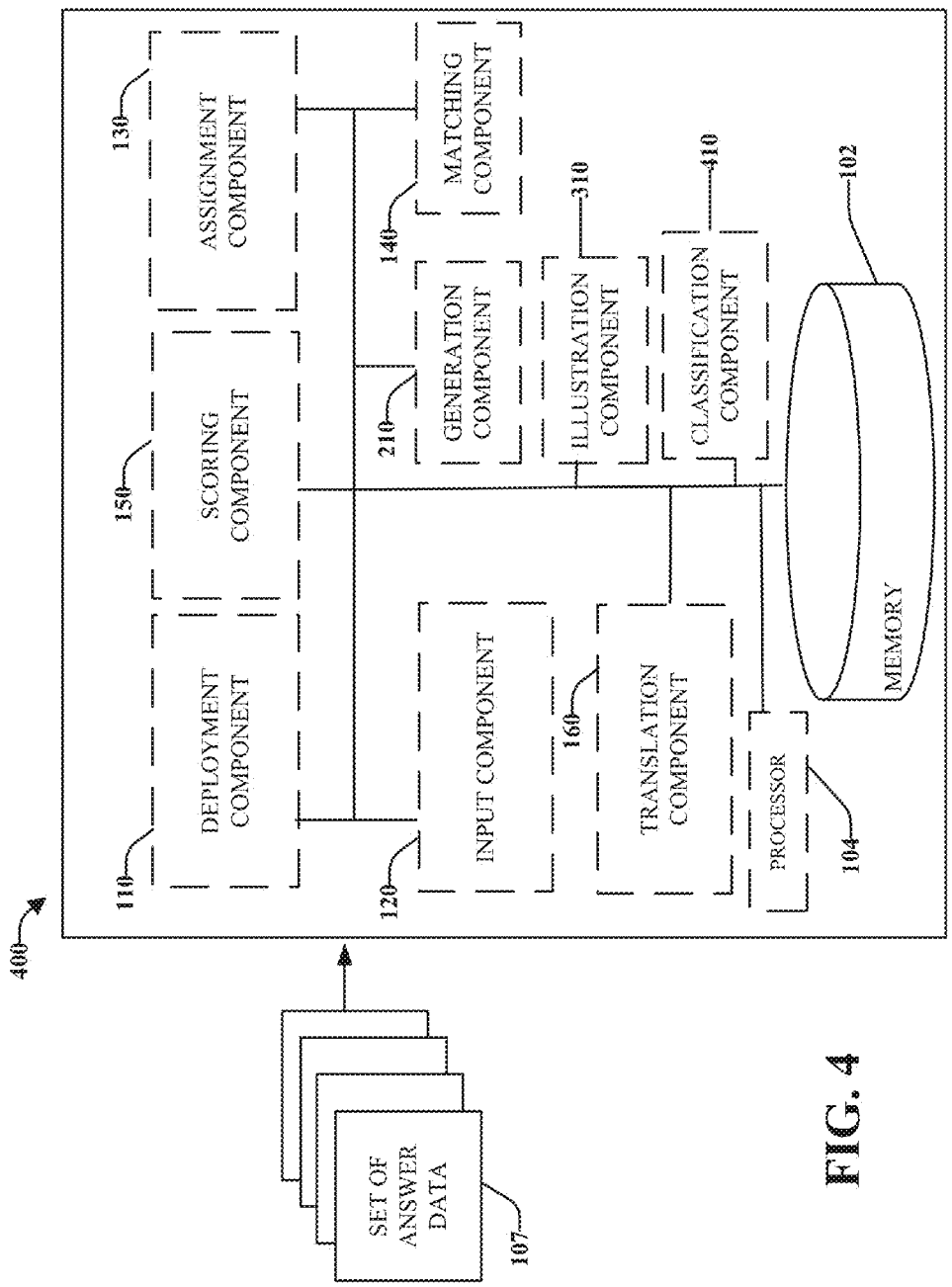
FIG. 4 illustrates an example non-limiting system for quantifying an organizational role capability.

Turning now to FIG. 4, presented is another non-limiting embodiment of system 400 in accordance with the subject of the disclosure. In an aspect, classification component 410 classifies the user fit score into a role capability class comprising at least one of: visionary, strategic, tactical or administrative. In an aspect, classification component can classify a user into any one or more of the four main categories of an organizational model, mainly; visionary, strategic, tactical, and administrative based on the user fit score. Accordingly, illustration component 310 in connection with classification component 410 can display a group of users of the organization plotted within a four-quadrant diagram to demonstrate the dispersion of individuals within the organization into the four role model classifications. The organization can understand the balance of roles satisfied in accordance with the organizational classification model and analyze the company strategy in light of such model.

Figure 5:
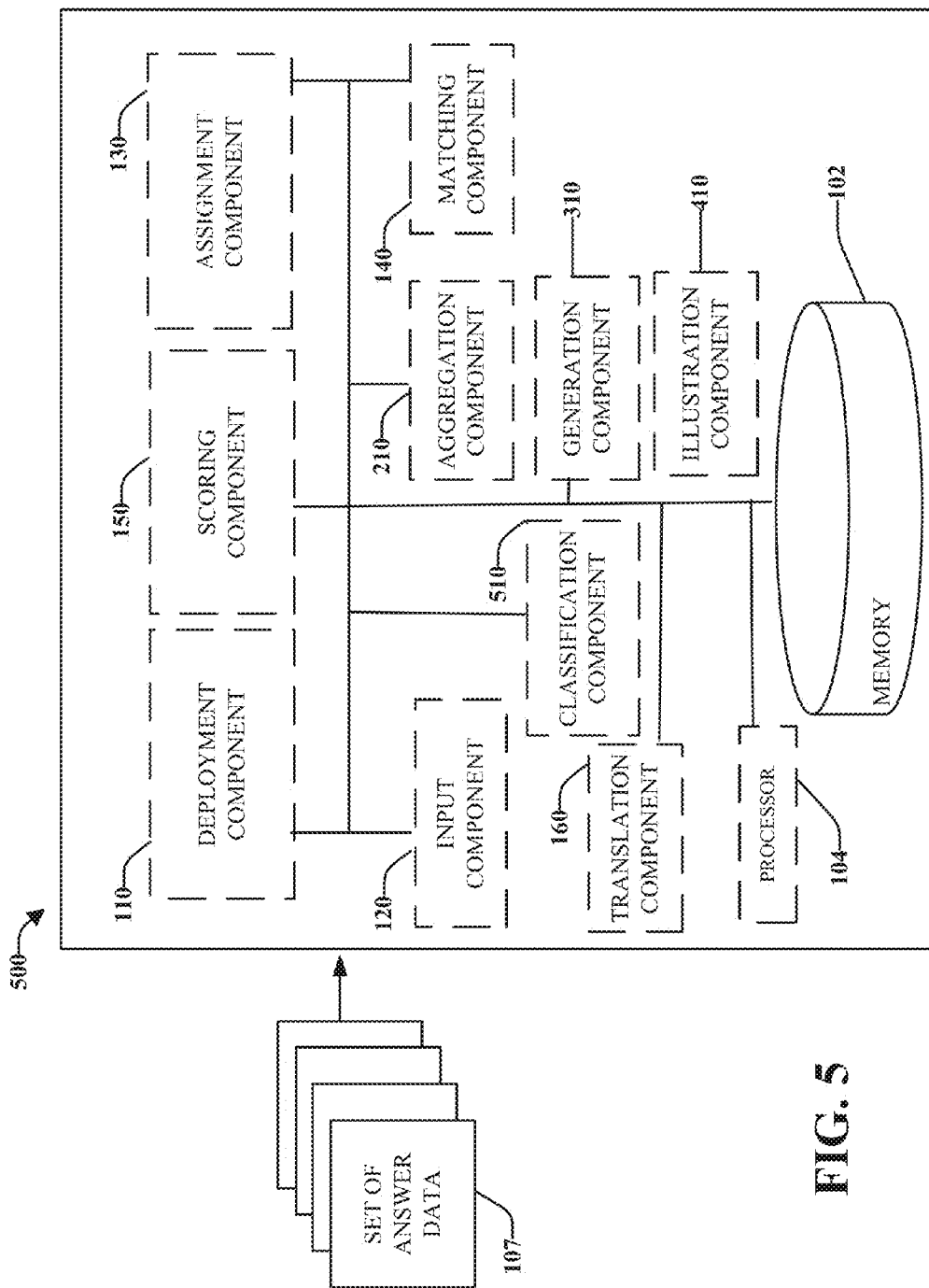
FIG. 5 illustrates an example non-limiting system for quantifying an organizational role capability.

Turning now to FIG. 5, presented is another non-limiting embodiment of system 500 in accordance with the subject of the disclosure. In an aspect, speech analysis component 510 analyzes the user voice, speech or conversational style to determine the user capability. The use of language by a speaker can convey meaning and meaning can correspond to user capability indicia such as perception, emotion, preference, or orientation. As such, analysis of speech can convey meaning by use of a variety of factors such as a speaker's language, dialect, accent, pitch, conversational style, voice frequency, and so on. In an aspect, system 500 can analyze speech to extract lexical and syntactic features from acoustic signals. Use of such extracted features can be used in coordination with the capability assessment and system 500 components to provide a fit score to a user based on speech, voice output, or conversational style.

In an embodiment, a microphone can capture user speech and voice output and speech analysis component 510 can analyze the user voice, speech or conversational style to determine a user capability. The speech analysis can be used in coordination with a capability assessment of system 500. Furthermore, in an aspect, system 500 can utilize a speech analysis model in connection with one or more role characteristic matrix to determine a user fit score based on at least the analyzed speech. In another aspect, the analysis component 510 can be configured to operate in connection with a mobile device. For example, a user can speak into a mobile phone microphone and system 500 can operate in coordination with the mobile phone (e.g. as a mobile application).

In an embodiment, the mobile device can comprise a deployment component configured to deploy to a user a capability assessment comprising at least one question whereby the user selects at least one answer that corresponds to the at least one question and the at least one answer conveys information to determine the capability of the user to perform an organizational role; an input component configured to receive a set of answer data associated with the at least one answer whereby the set of answer data correlates to the capability of the user to perform a role within an organization; an assignment component configured to assign a data value to a subset of answer data based on at least one statistic whereby the data value corresponds to at least one organizational development level; a matching component configured to match the data value to at least one organizational development level based on at least one role characteristic in accordance with at least one role characteristic matrix; a scoring component configured to determine a user fit score corresponding to the user whereby the user fit score is based at least on the matched data in association with a fit model; and a translation component configured to translate the user fit score into a semantic representation for presentation at a user interface.

Figure 6:
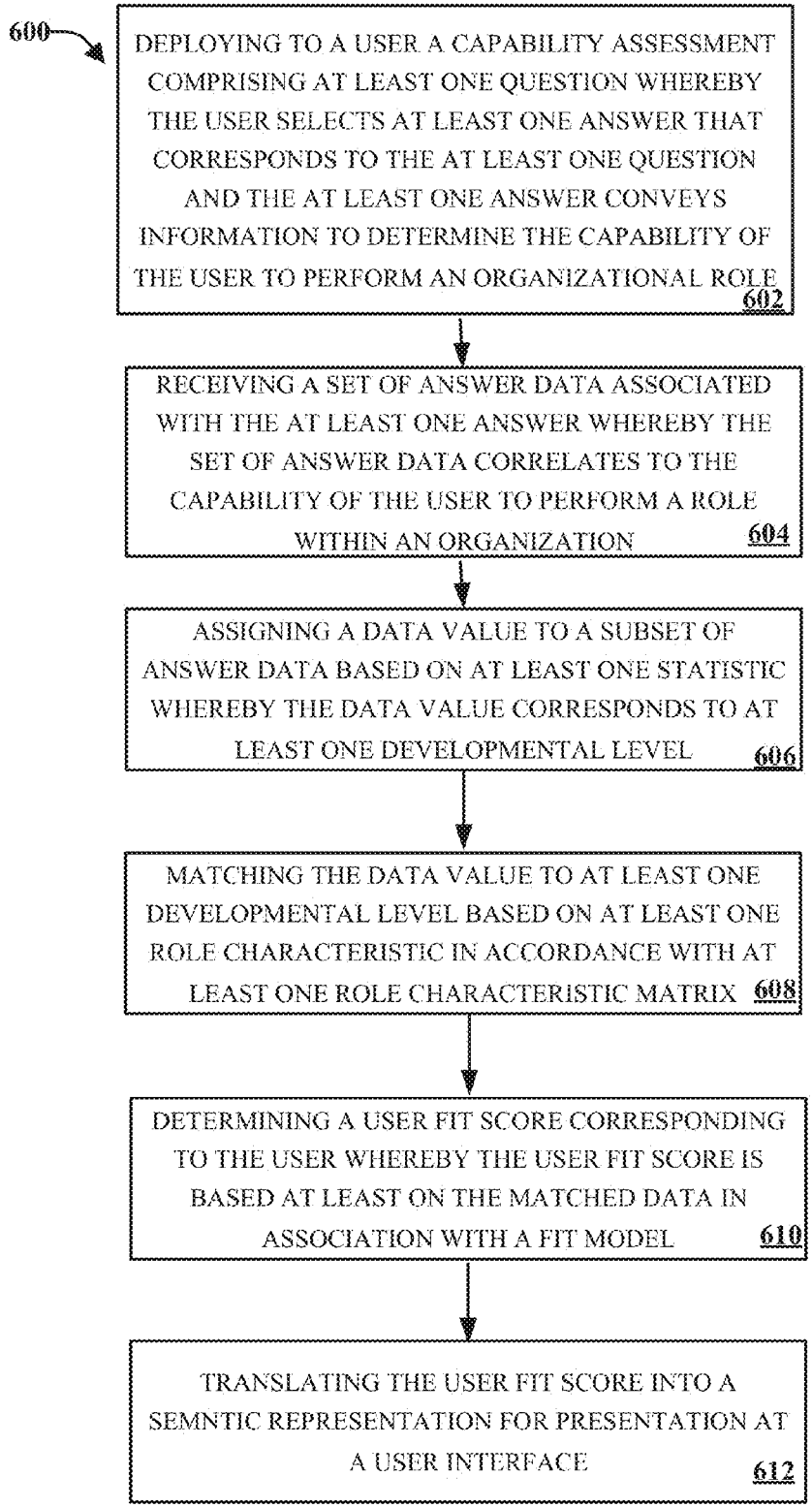
FIG. 6 illustrates an example methodology for quantifying an organizational role capability.
Figure 7:
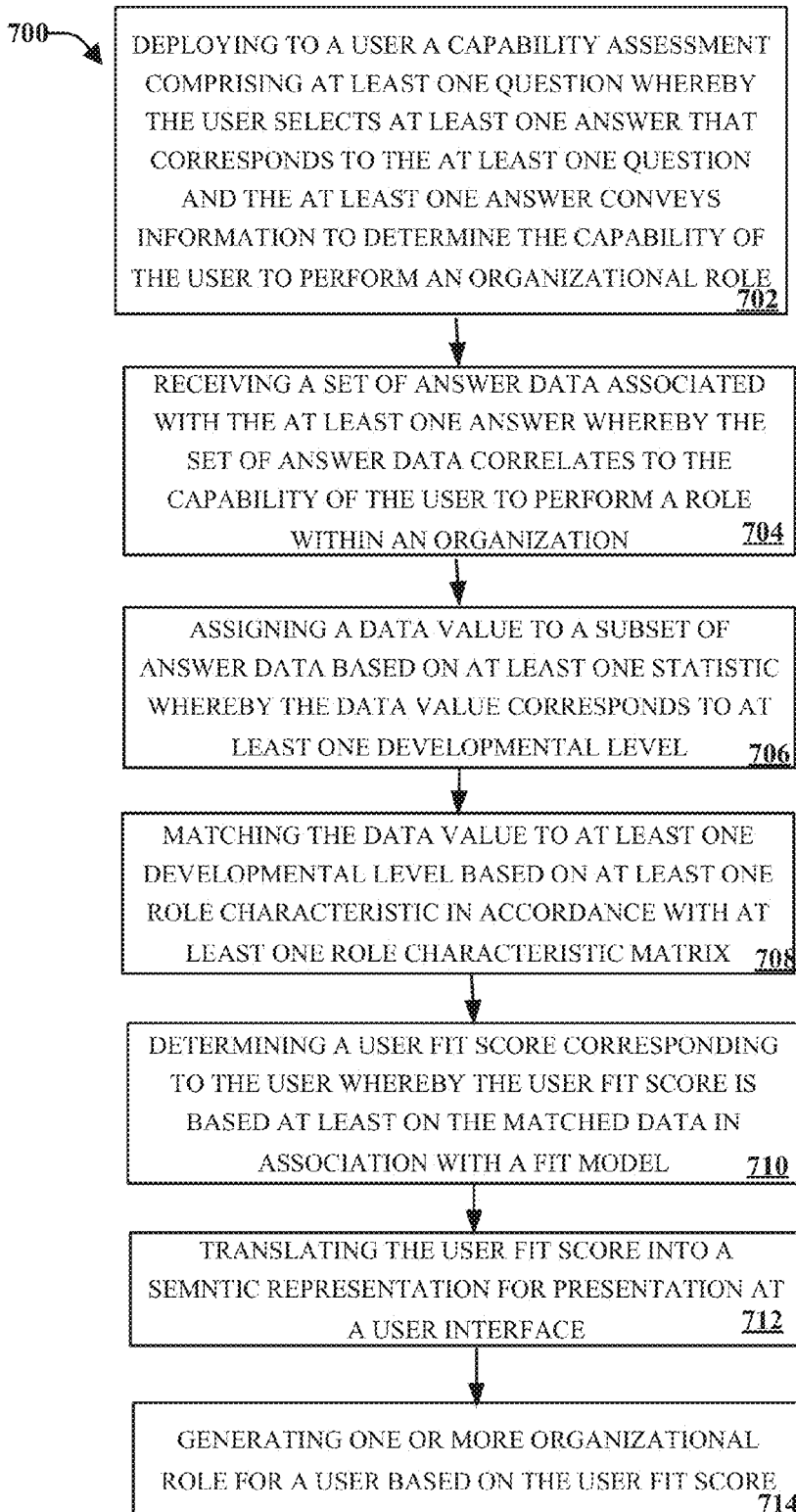
FIG. 7 illustrates an example methodology for quantifying an organizational role capability.
Figure 8:
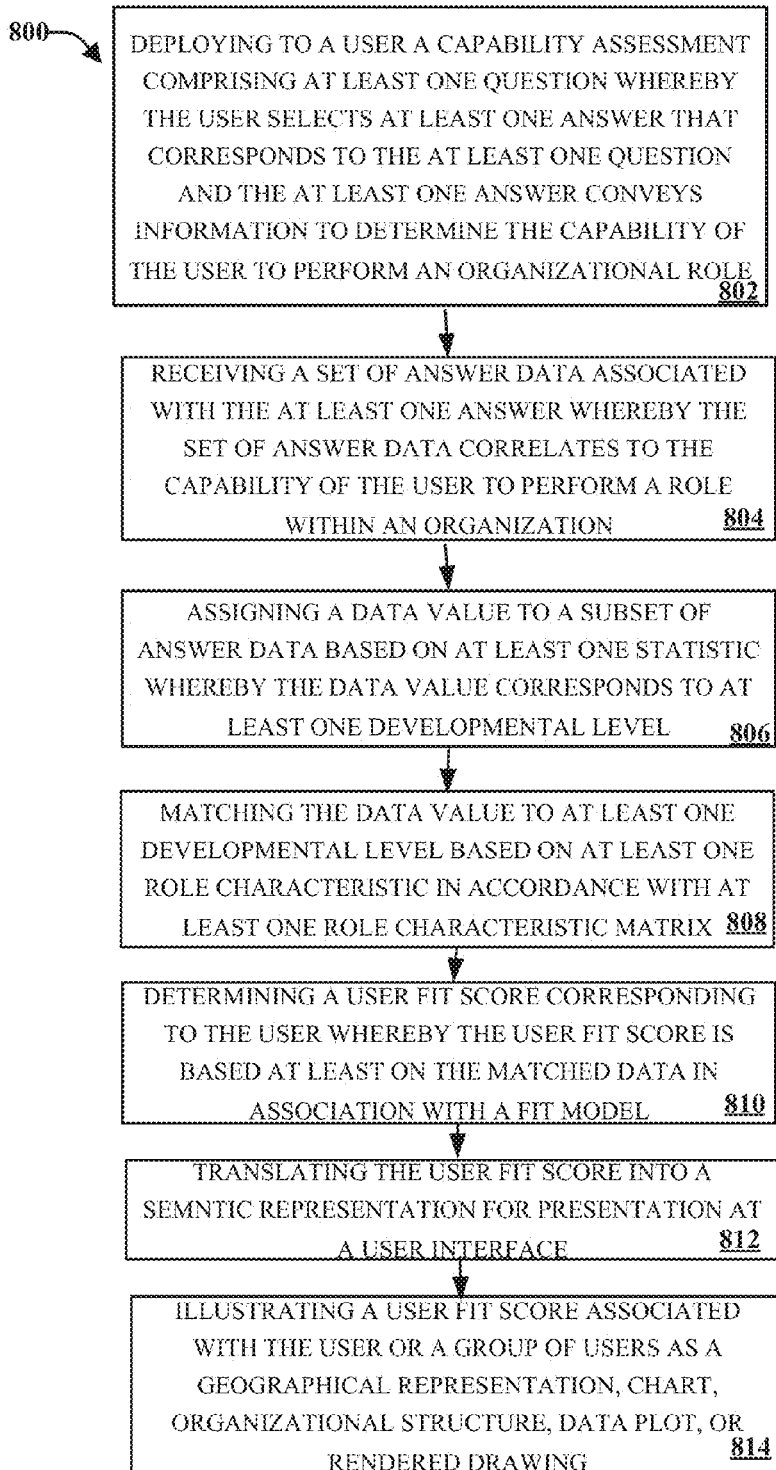
FIG. 8 illustrates an example methodology for quantifying an organizational role capability.

FIGS. 6-8 illustrates a methodology or flow diagram in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, presented is a flow diagram of an example application of role capability system disclosed in this description in accordance with an embodiment. In an aspect, exemplary methodology 600 of a role capability system is stored in a memory and utilizes a processor to execute computer executable instructions to perform functions. At 602, role capability system deploys (e.g. using deployment component 110), to a user, a role capability assessment comprising at least one question whereby the user selects at least one answer that corresponds to the at least one question and the at least one answer conveys information to determine the capability of the user to perform an organizational role. At 604, capability system receives (e.g. using input component) a set of answer data associated with the at least one answer whereby the set of answer data correlates to the capability of the user to perform a role within an organization.

At 606, role capability system assigns (e.g. using assignment component 130) a data value to a subset of answer data based on at least one statistic whereby the data value corresponds to at least one organizational development level. In an aspect, the at least one statistic is at least one of a weight, mean, median, variance, or standard deviation of the subset of answer data. At 608, role capability system matches (e.g. using matching component 140) the data value to at least one organizational development level based on at least one role characteristic in accordance with at least one role characteristic matrix. In an aspect, the role characteristic matrix is at least one of an orientation matrix or a preference matrix. At 610, role capability system determines (e.g. using scoring component) a user fit score corresponding to the user whereby the user fit score is based at least on the matched data in association with a fit model. In an aspect, the user fit score is comprised of a two-digit primary number and a one-digit secondary number whereby the primary number and the secondary number are separated by a colon. At 612, role capability system translates the user fit score into a semantic representation for presentation at a user interface.

Referring now to FIG. 7, presented is a flow diagram of an example application of role capability system disclosed in this description in accordance with an embodiment. In an aspect, exemplary methodology 700 of a role capability system is stored in a memory and utilizes a processor to execute computer executable instructions to perform functions. At 702, role capability system deploys (e.g. using deployment component 110), to a user, a role capability assessment comprising at least one question whereby the user selects at least one answer that corresponds to the at least one question and the at least one answer conveys information to determine the capability of the user to perform an organizational role. At 704, role capability system receives (e.g. using input component) a set of answer data associated with the at least one answer whereby the set of answer data correlates to the capability of the user to perform a role within an organization.

At 706, role capability system assigns (e.g. using assignment component 130) a data value to a subset of answer data based on at least one statistic whereby the data value corresponds to at least one organizational development level. In an aspect, the at least one statistic is at least one of a weight, mean, median, variance, or standard deviation of the subset of answer data. At 708, role capability system matches (e.g. using matching component 140) the data value to at least one organizational development level based on at least one role characteristic in accordance with at least one role characteristic matrix. In an aspect, the role characteristic matrix is at least one of an orientation matrix or a preference matrix. At 710, role capability system determines (e.g. using scoring component) a user fit score corresponding to the user whereby the user fit score is based at least on the matched data in association with a fit model. In an aspect, the user fit score is comprised of a two-digit primary number and a one-digit secondary number whereby the primary number and the secondary number are separated by a colon. At 712, role capability system translates the user fit score into a semantic representation for presentation at a user interface. At 714, role capability system generates (e.g. using generation component 210) one or more organizational role for a user based on the user fit score.

Referring now to FIG. 8, presented is a flow diagram of an example application of role capability system disclosed in this description in accordance with an embodiment. In an aspect, exemplary methodology 800 of a role capability system is stored in a memory and utilizes a processor to execute computer executable instructions to perform functions. At 802, role capability system deploys (e.g. using deployment component 110), to a user, a role capability assessment comprising at least one question whereby the user selects at least one answer that corresponds to the at least one question and the at least one answer conveys information to determine the capability of the user to perform an organizational role. At 804, role capability system receives (e.g. using input component) a set of answer data associated with the at least one answer whereby the set of answer data correlates to the capability of the user to perform a role within an organization.

At 806, role capability system assigns (e.g. using assignment component 130) a data value to a subset of answer data based on at least one statistic whereby the data value corresponds to at least one organizational development level. In an aspect, the at least one statistic is at least one of a weight, mean, median, variance, or standard deviation of the subset of answer data. At 808, role capability system matches (e.g. using matching component 140) the data value to at least one organizational development level based on at least one role characteristic in accordance with at least one role characteristic matrix. In an aspect, the role characteristic matrix is at least one of an orientation matrix or a preference matrix.

At 810, role capability system determines (e.g. using scoring component) a user fit score corresponding to the user whereby the user fit score is based at least on the matched data in association with a fit model. In an aspect, the user fit score is comprised of a two-digit primary number and a one-digit secondary number whereby the primary number and the secondary number are separated by a colon. At 812, role capability system translates the user fit score into a semantic representation for presentation at a user interface. At 814, role capability system illustrates (e.g. using illustration component 310) a user fit score associated with the user or a group of users as a geographical representation, chart, organizational structure, data plot, or rendered drawing.

Figure 9:
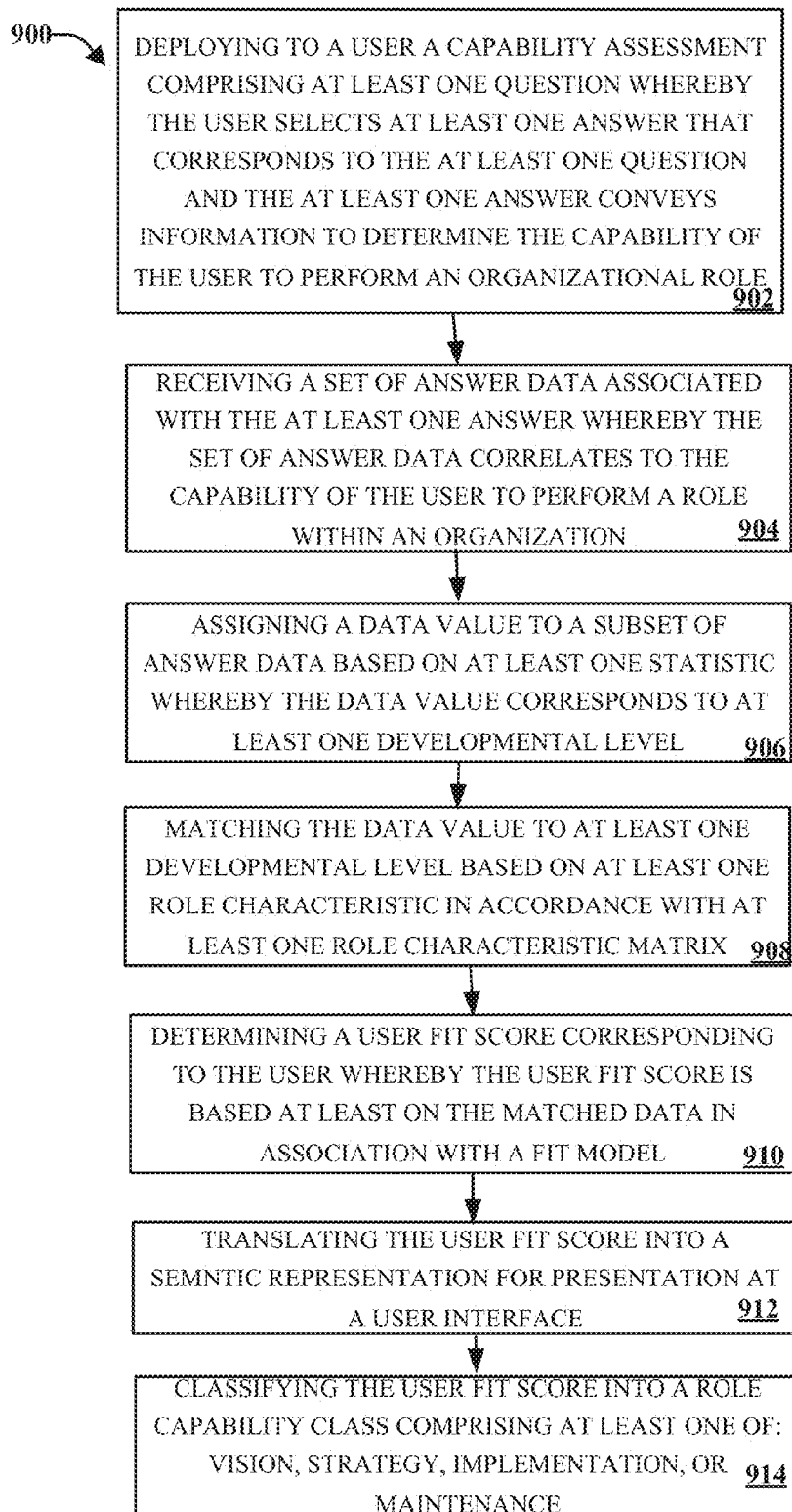
FIG. 9 illustrates an example methodology for quantifying an organizational role capability.

Referring now to FIG. 9, presented is a flow diagram of an example application of role capability system disclosed in this description in accordance with an embodiment. In an aspect, exemplary methodology 900 of a role capability system is stored in a memory and utilizes a processor to execute computer executable instructions to perform functions. At 902, role capability system deploys (e.g. using deployment component 110), to a user, a role capability assessment comprising at least one question whereby the user selects at least one answer that corresponds to the at least one question and the at least one answer conveys information to determine the capability of the user to perform an organizational role. At 904, role capability system receives (e.g. using input component) a set of answer data associated with the at least one answer whereby the set of answer data correlates to the capability of the user to perform a role within an organization.

At 906, role capability system assigns (e.g. using assignment component 130) a data value to a subset of answer data based on at least one statistic whereby the data value corresponds to at least one organizational development level. In an aspect, the at least one statistic is at least one of a weight, mean, median, variance, or standard deviation of the subset of answer data. At 908, role capability system matches (e.g. using matching component 140) the data value to at least one organizational development level based on at least one role characteristic in accordance with at least one role characteristic matrix. In an aspect, the role characteristic matrix is at least one of a orientation matrix or a preference matrix. At 910, role capability system determines (e.g. using scoring component) a user fit score corresponding to the user whereby the user fit score is based at least on the matched data in association with a fit model. In an aspect, the user fit score is comprised of a two-digit primary number and a one-digit secondary number whereby the primary number and the secondary number are separated by a colon. At 912, role capability system translates the user fit score into a semantic representation for presentation at a user interface. At 914, role capability system classifies (e.g. using classification component 410) the user fit score into a role capability class comprising at least one of: visionary, strategic, tactical, or administrative.

Figure 10:
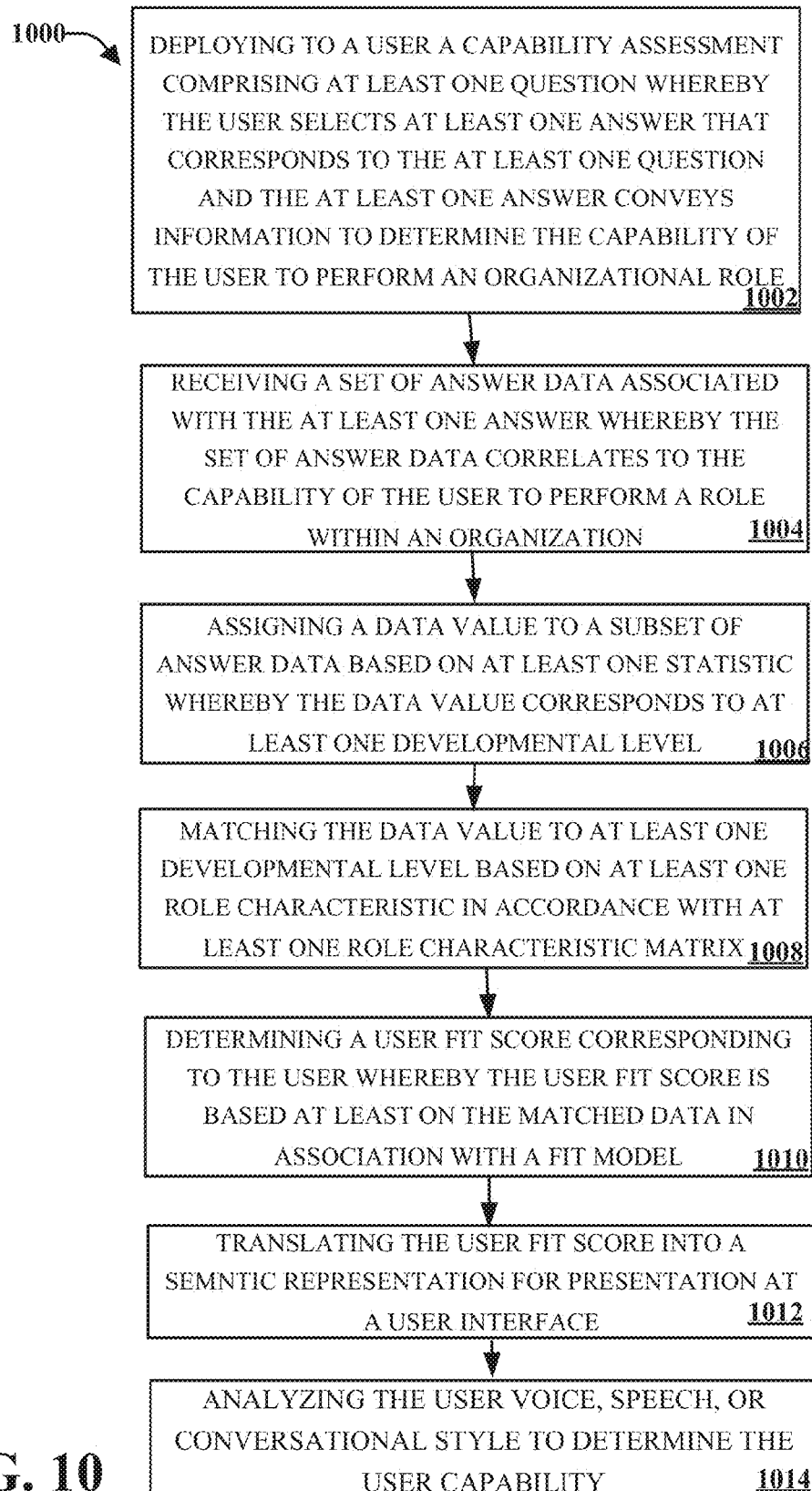
FIG. 10 illustrates an example methodology for quantifying an organizational role capability.

Referring now to FIG. 10, presented is a flow diagram of an example application of role capability system disclosed in this description in accordance with an embodiment. In an aspect, exemplary methodology 1000 of a role capability system is stored in a memory and utilizes a processor to execute computer executable instructions to perform functions. At 1002, role capability system deploys (e.g. using deployment component 110), to a user, a role capability assessment comprising at least one question whereby the user selects at least one answer that corresponds to the at least one question and the at least one answer conveys information to determine the capability of the user to perform an organizational role. At 1004, role capability system receives (e.g. using input component) a set of answer data associated with the at least one answer whereby the set of answer data correlates to the capability of the user to perform a role within an organization.

At 1006, role capability system assigns (e.g. using assignment component 130) a data value to a subset of answer data based on at least one statistic whereby the data value corresponds to at least one organizational development level. In an aspect, the at least one statistic is at least one of a weight, mean, median, variance, or standard deviation of the subset of answer data. At 1008, role capability system matches (e.g. using matching component 140) the data value to at least one organizational development level based on at least one role characteristic in accordance with at least one role characteristic matrix. In an aspect, the role characteristic matrix is at least one of a orientation matrix or a preference matrix. At 1010, role capability system determines (e.g. using scoring component) a user fit score corresponding to the user whereby the user fit score is based at least on the matched data in association with a fit model. In an aspect, the user fit score is comprised of a two-digit primary number and a one-digit secondary number whereby the primary number and the secondary number are separated by a colon. At 1012, role capability system translates the user fit score into a semantic representation for presentation at a user interface. At 1014, role capability system analyzes (e.g. using speech analysis component 510) the user voice, speech, or conversational style to determine the user capability.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
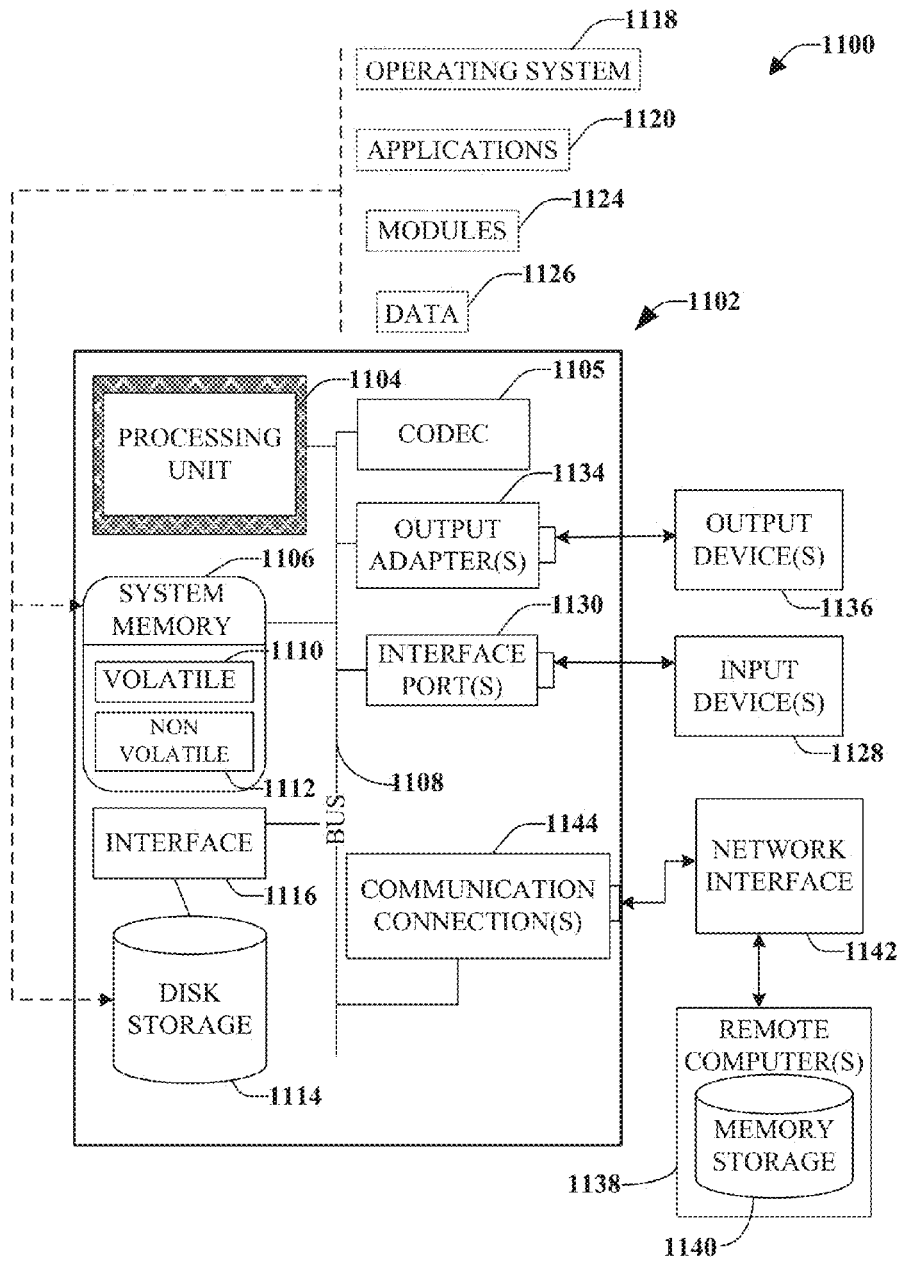
FIG. 11 is a block diagram representing an exemplary non-limiting networked environment in which the various embodiments can be implemented.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1105 may include at least one of an encoder or decoder, wherein the at least one of an encoder or decoder may consist of hardware, a combination of hardware and software, or software. Although, codec 1105 is depicted as a separate component, codec 1105 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by the operating system through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
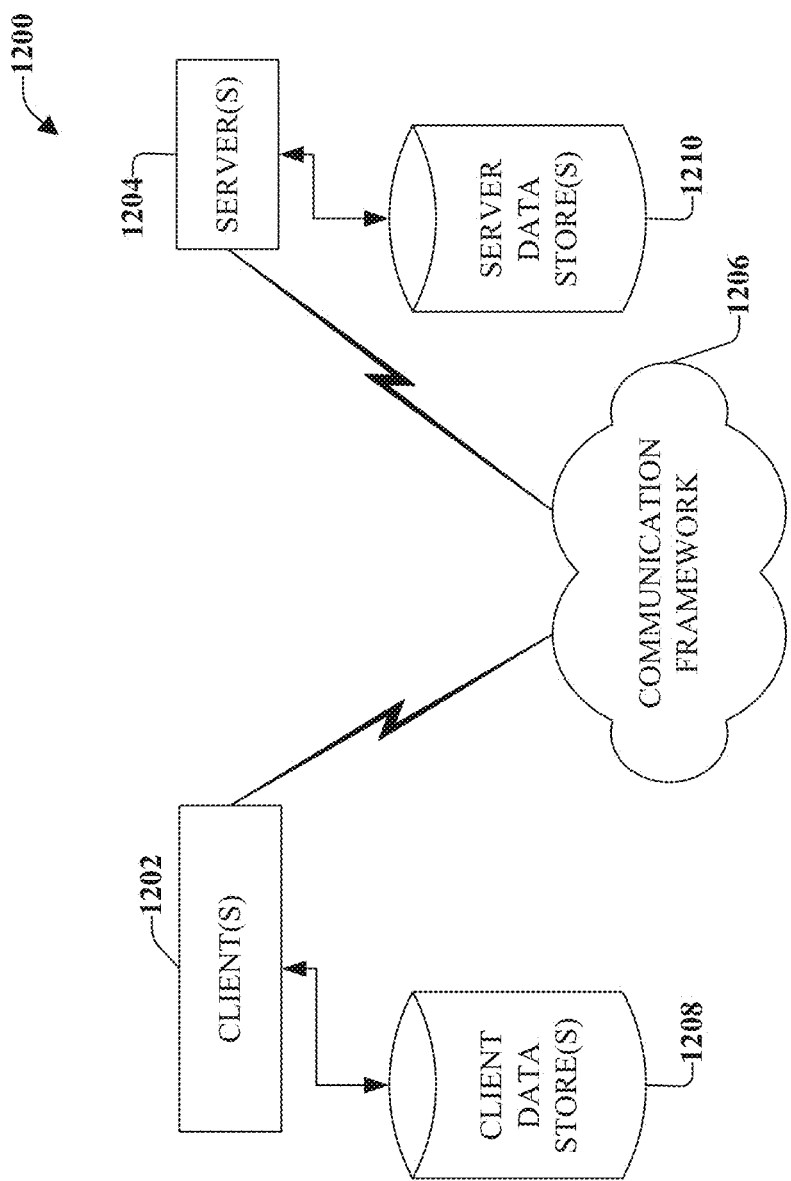
FIG. 12 is a block diagram representing an exemplary non-limiting computing system or operating environment in which the various embodiments may be implemented.

Referring now to FIG. 12, there is illustrated a schematic block diagram of a computing environment 1200 in accordance with this disclosure. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes wherein the data packet may include video data. The data packet can include a metadata, such as associated contextual information for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 include or are operatively connected to one or more client data store(s) 1208 that can be employed to store information local to the client(s) 1202 (e.g., associated contextual information). Similarly, the server(s) 1204 are operatively include or are operatively connected to one or more server data store(s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising: a memory to store instructions; a processor, communicatively coupled to the memory, that executes or facilitates execution of the instructions, the instructions comprising:
    a deployment component configured to deploy a capability assessment comprising a set of questions, wherein a set of answer data of a set of answers corresponding to the set of questions represents information associated with a user capability to perform an organizational role;
    an input component configured to receive the set of answer data based on a selection of at least one answer to a respective question of the set of questions;
    a matching component configured to match the set of answer data to an organizational role based on a role characteristic matrix; and
    a scoring component configured to determine a user fit score corresponding to a degree of compatibility between the user capability and the organizational role, wherein the user fit score is determined based at least on the matched set of answer data in association with a fit model;
    wherein the user fit score is comprised of a two-digit primary number and a one-digit secondary number, wherein the two-digit primary number and the one-digit secondary number are separated by a colon, wherein the two-digit primary number represents a user work orientation and the one-digit secondary number represents a user role preference,
    wherein the primary number of the user fit score is calculated based on information associated with a work orientation matrix, wherein the secondary number of the user fit score is calculated based on information associated with a role preference matrix, wherein a higher primary number indicates an increased proclivity for performing unstructured work as compared to a lower primary number which indicates an increased proclivity for performing structured work;
    wherein a lower secondary number indicates an increased proclivity to work alone, and wherein a higher secondary number indicates an increased proclivity to work in a group; and a translation component configured to translate the user fit score into a semantic representation for presentation at a user interface.

2. The system of claim 1, wherein the fit model is a framework that facilitates identification of a user capability or a user fitness to perform an organizational role based on the user capability.

3. The system of claim 2, further comprising an assignment component configured to assign a data value to a subset of answer data based on at least one statistic, wherein the data value corresponds to at least one of an organizational development class, a role characteristic, an orientation of the user capability or a user preference.

4. The system of claim 1, wherein the user role capability is at least one of a work orientation indicator, a role preference indicator, or a job capability indicator.

5. The system of claim 1, wherein the answer relates to at least one of a decision-making ability, a task management ability, an ability to work in teams, or a proclivity for engagement.

6. The system of claim 3, wherein the at least one statistic is at least one of a weight, a mean, a median, variance, or a standard deviation of the subset of answer data.

7. The system of claim 1, further comprising a generation component configured to generate a list of one or more organizational alignment classification based on the user fit score.

8. The system of claim 1, further comprising an illustration component configured to generate an illustration associated with the user fit score, a group of user fit scores, or the set of answer data, wherein the illustration comprises at least one of a graphical representation, a chart, an organizational structure, a diagram, a data plot, or a rendered drawing.

9. The system of claim 1, further comprising a classification component configured to classify the user fit score into a role capability class comprising at least one of a visionary class, a strategic class, a tactical class or an administrative class.

10. The system of claim 1, further comprising a speech analysis component configured to analyze a voice, a speech structure, an intonation, or a conversational style to determine the user capability.

11. A method comprising:
using a processor to execute the following computer executable instructions stored in a memory to perform the following acts:
deploying, by a system comprising a processor, a role capability assessment comprising at least one question, wherein at least one answer selection corresponds to the at least one question and the at least one answer selection represents information to determine a capability to perform an organizational role;
receiving, by the system, a set of answer data associated with the at least one answer selection, wherein the set of answer data correlates to the capability to perform the organizational role;
matching, by the system, a data value corresponding to a subset of answer data of the set of answer data to at least one organizational development class based on at least one role characteristic using role characteristic matrix;
determining, by the system, a user fit score that represents a level of fitness to perform the organizational role based at least on the matched data value using a fitness model;
wherein the user fit score is comprised of a two-digit primary number and a one-digit secondary number, wherein the two-digit primary number and the one-digit secondary number are separated by a colon, wherein the two-digit primary number represents a user work orientation and the one-digit secondary number represents a user role preference,
wherein the primary number of the user fit score is calculated based on information associated with a work orientation matrix, wherein the secondary number of the user fit score is calculated based on information associated with a role preference matrix, wherein a higher primary number indicates an increased proclivity for performing unstructured work as compared to a lower primary number which indicates an increased proclivity for performing structured work;
wherein a lower secondary number indicates an increased proclivity to work alone, and wherein a higher secondary number indicates an increased proclivity to work in a group; and
a translation component configured to translate the user fit score into a semantic representation for presentation at a user interface.

12. The method of claim 11, further comprising illustrating, by the system, the user fit score or a group of user fit scores as a graphical representation, a chart, an organizational structure, a data plot, or a rendered drawing.

13. The method of claim 11, further comprising classifying, by the system, the user fit score into the organizational development class comprising at least one of a visionary class, a strategic class, a tactical class or an administrative class.

14. The method of claim 11, further comprising analyzing, by the system, a user voice, a user speech characteristic or a user conversational style to determine the capability.

15. The method of claim 11, further comprising facilitating, by the system, the at least one question to prompt a selection of an at least one answer from a set of answers, wherein the at least one answer selection correlates to at least one role capability indicator.

16. The method of claim 15, further comprising selecting, by the system, at least one assessment answer associated with each assessment question based at least on a semantic resonance characteristic of the at least one assessment answer.

17. A system comprising:
a memory to store instructions;
a processor, communicatively coupled to the memory, that executes or facilitates execution of the instructions, the instructions comprising:
a deployment component configured to deploy, by an application executing on a device, a capability assessment comprising at least one question, wherein at least one answer selection corresponds to the at least one question and the at least one answer represents information to determine a user capability to perform an organizational role;
an input component configured to receive, by the application executing on the device, a set of answer data associated with the at least one answer, wherein the set of answer data correlates to the user capability to perform a role within an organization;
a matching component configured to match, by the application executing on the device, a data value of a subset of answer data of the set of answer data to at least one organizational development class and at least one role characteristic using a role characteristic matrix; and
a scoring component configured to determine, by the application executing on the device, a user fit score representing a degree of compatibility between the user capability and the organizational role based at least on the matched data value in association with a fitness model;

wherein the user fit score is comprised of a two-digit primary number and a one-digit secondary number, wherein the two-digit primary number and the one-digit secondary number are separated by a colon, wherein the two-digit primary number represents a user work orientation and the one-digit secondary number represents a user role preference, wherein the primary number of the user fit score is calculated based on information associated with a work orientation matrix, wherein the secondary number of the user fit score is calculated based on information associated with a role preference matrix, wherein a higher primary number indicates an increased proclivity for performing unstructured work as compared to a lower primary number which indicates an increased proclivity for performing structured work;

wherein a lower secondary number indicates an increased proclivity to work alone, and wherein a higher secondary number indicates an increased proclivity to work in a group; and a translation component configured to translate the user fit score into a semantic representation for presentation at a user interface.

18. The device of claim 17, further comprising an illustration component that illustrates, by the application executing on the device, the user fit score or a group of user fit scores as a graphical representation, a chart, an organizational structure, a data plot, or a rendered drawing presented at a user interface of the device.

* * * * *